(12) United States Patent
Smith et al.

(10) Patent No.: US 10,427,493 B2
(45) Date of Patent: Oct. 1, 2019

(54) MODULAR HVAC SYSTEM

(71) Applicant: Caterpillar Underground Mining Pty Ltd., South Burnie (AU)

(72) Inventors: Brendan Smith, Upper Burnie (AU); Michael Wolfert, Ulverstone (AU); Leon White, Burnie (AU)

(73) Assignee: Caterpillar Underground Mining Pty Ltd, South Burnie (AU)

( * ) Notice: Subject to any disclaimer, the term of this patent is extended or adjusted under 35 U.S.C. 154(b) by 102 days.

(21) Appl. No.: 15/362,893

(22) Filed: Nov. 29, 2016

(65) Prior Publication Data
US 2017/0151854 A1 Jun. 1, 2017

(51) Int. Cl.
| | |
|---|---|
| *B60H 1/00* | (2006.01) |
| *B60H 1/12* | (2006.01) |
| *B60H 1/32* | (2006.01) |
| *E02F 9/08* | (2006.01) |
| *E21F 13/02* | (2006.01) |

(52) U.S. Cl.
CPC ..... *B60H 1/00542* (2013.01); *B60H 1/00007* (2013.01); *B60H 1/00378* (2013.01); *B60H 1/00535* (2013.01); *B60H 1/00564* (2013.01); *B60H 1/12* (2013.01); *B60H 1/3229* (2013.01); *E02F 9/0833* (2013.01); *E02F 9/0858* (2013.01); *E21F 13/02* (2013.01)

(58) Field of Classification Search
CPC ............ B60H 1/00542; B60H 1/00564; B60H 1/00535; B60H 1/00378; B60H 1/00007; B60H 1/12; B60H 1/3229; E02F 9/0833; E02F 9/0858

USPC ......................................................... 454/142
See application file for complete search history.

(56) References Cited

U.S. PATENT DOCUMENTS

| | | | | |
|---|---|---|---|---|
| 4,098,093 | A | | 7/1978 | Czyl |
| 4,608,834 | A | * | 9/1986 | Rummel ............ B60H 1/00378 296/216.02 |
| 4,679,616 | A | * | 7/1987 | Ferdows ............ B60H 1/00371 165/43 |
| 5,184,474 | A | * | 2/1993 | Ferdows ............ B60H 1/00371 62/244 |
| 5,222,372 | A | * | 6/1993 | DeRees ................ B60H 1/0005 62/237 |
| 6,223,807 | B1 | | 5/2001 | Asche et al. |
| 6,398,294 | B1 | | 6/2002 | Bollweg et al. |

(Continued)

FOREIGN PATENT DOCUMENTS

WO    WO-2013/000040 A1    1/2013

*Primary Examiner* — Steven B McAllister
*Assistant Examiner* — Allen R Schult
(74) *Attorney, Agent, or Firm* — Miller, Matthias & Hull (57) ABSTRACT

A heating, ventilation, and air conditioning (HVAC) module, for a HVAC system, mountable to a work machine, the HVAC module comprising a housing having at least one air outlet and at least one air inlet communicable with ducting on the work machine for conveying air into and out of the operator cab of the work machine. The module also includes a mounting assembly for pivotably attaching the housing to the work machine. The housing is moveable between an operating position where the outlet and inlet are in contact with a ducting interface on the work machine, and a maintenance position, where the housing is pivoted upwards to disconnect from ducting interface of the work machine to allow access to underlying components of the work machine.

20 Claims, 9 Drawing Sheets

(56) References Cited

U.S. PATENT DOCUMENTS

| | | |
|---|---|---|
| 8,944,201 B2 | 2/2015 | Krellner et al. |
| 9,943,033 B1 * | 4/2018 | Gaeddert ............. A01D 43/063 |
| 2007/0000263 A1 | 1/2007 | McEnaney et al. |
| 2007/0145781 A1 | 6/2007 | Haboon et al. |
| 2010/0126188 A1 | 5/2010 | Clarke |
| 2012/0103712 A1 | 5/2012 | Stanek et al. |
| 2014/0086759 A1 | 3/2014 | Hovel et al. |
| 2014/0166233 A1 | 6/2014 | Wehrenberg |

\* cited by examiner

MODULAR HVAC SYSTEM

CROSS-REFERENCE TO RELATED APPLICATION

This application claims priority under 35 USC § 119 and the Paris Convention to Australian Application No. 2015261737 filed on Nov. 30, 2015.

TECHNICAL FIELD

This disclosure relates generally to heating, ventilation and air conditioning (HVAC) systems, and more particularly to a modular assembly design for a HVAC system on a work machine.

BACKGROUND

In existing underground mining machines, such as load-haul-dump machines, the heating, ventilation and air conditioning ("HVAC") components are positioned in various locations around the machine. This can make maintenance of a HVAC system difficult and time consuming.

Exterior of the cab, a compressor charges a refrigerant fluid to the optimum pressure for cooling efficiency and circulates it around the system. A condenser and fan package is located near the engine radiators. The condenser and fan cools the refrigerant at high pressure, so that at discharge the refrigerant potential thermal energy is well below that of the ambient environment.

Within the cab of the machine, an evaporator core and blower unit are co-located in a conditioner box, typically attached to the ceiling of the cab. The evaporator core cools air that is pushed through by the blower. Assisting the evaporator core is an expansion valve, which regulates the refrigerant flow within the evaporator. Allowing expansion of the fluid within the evaporator increases the potential cooling capacity, as the expansion further cools the fluid.

An optional heater core utilises warm engine coolant to heat the same air stream, if the operator is cold. A pressuriser is mounted on the cab outer wall and provides fresh air at a higher-than-ambient pressure to the cab. This ensures that any air leaks result in an outward flow from the cab to the environment.

The mounting of various components within the cab encroaches on the limited space available for the operator. Having the conditioner box located near the head of the operator can result in possible head injuries and also elevated noise levels. It also makes direction of the air difficult to control, particularly for demisting requirements.

The spacing out of various components can result in efficiency losses and poor control of the airflow, decreasing performance. It also makes servicing difficult, as mountings and couplings must be in easy-to-reach locations, and can prove time consuming to troubleshoot.

Whilst there have been a number of HVAC system designs that co-locate more of the components together, these are typically designed for above ground machines. However, underground machines have a further limitation on space due to the restricted width and ceiling height of underground tunnels. As the tunnels do not allow for turning of a vehicle, underground load-haul-dump machines run both backwards and forwards along the tunnel. Load-haul-dump machines are long and narrow and have a relatively low cab, with a driver typically sitting transverse to the direction of travel. The machine is articulated in its centre to provide steering capacity. All of these factors result in poor operator visibility. Therefore, the location of external components on a machine is critical to ensuring sufficient visibility is provided for the operator.

The present disclosure is directed to one or more of the problems identified above.

SUMMARY

According to a first aspect of the invention there is provided a heating, ventilation, and air conditioning (HVAC) module, for a HVAC system, mountable to a work machine, the HVAC module comprising:

a housing having at least one air outlet and at least one air inlet communicable with ducting on the work machine for conveying air into and out of the operator cab of the work machine;

a mounting assembly for pivotably attaching the housing to the work machine, the housing being moveable between an operating position where the outlet and inlet are in contact with a ducting interface on the work machine, and a maintenance position, where the housing is pivoted upwards to disconnect from the ducting interface of the work machine to allow access to underlying components of the work machine.

The ducting on the work machine can include a receiver box located on the top deck adjacent the location of the HVAC module. The receiver box preferably includes two channels, an inlet channel and an outlet channel. Connected to the receiver box in fluid communication with the inlet and outlet channels are inlet and outlet ducts respectively. The inlet and outlet ducts may each be comprised of a fixed duct section connected at one end to the operator cab, and a flexible duct section connecting the fixed duct section to the receiver box.

The fixed duct sections and/or receiver box can be made from sheet steel and have a boxed construction, to ensure adequate strength and robustness. The flexible duct section can be made from rubber hump hose, which typically is robust, yet assists in sealing while allowing axial misalignment.

The receiver box can be shaped to have a generally rectangular footprint. The inlet channel and outlet channel are preferably aligned one above the other, preferably both running in a generally horizontal direction. The upper channel of the inlet and outlet channels can have a shorter distance to the lower channel; this can result in the upper surface being stepped. In such an embodiment, two upper surface sections are provided having a generally flat surface with an upwardly orientated opening. The upwardly orientated openings may include a honeycomb plate with plurality of hexagonal apertures. The upwardly orientated openings form the ducting interface for the HVAC module.

The housing may comprise a lower box and an upper lid. The lid may be clamped to the lower box in use and may be pivotally connected to the lower box. The lower box and upper lid can be made from sheet metal.

The air inlet and/or outlet of the housing may include a hood to create a channel to an opening. The opening is preferably orientated to be downward facing in the operating position. The inlet opening and the outlet opening are preferably located on the same side of the housing; this may be on the side opposite the pivot hinge connection. Surrounding the openings can be a seal, which may compress under pressure.

In the operating position, the downward facing openings of the HVAC module abut against the upwardly orientated openings of the receiver box, with their respective surfaces aligned. The interface between the respective openings is sealed by the seal located about the downward facing openings, in order to protect the seal from damage while in the service position. However, it will be appreciated that the seal may be located about the upwardly orientated openings. In the operation position, the housing may be clamped to the receiver box ensuring the seal is maintained. When moving the housing into the maintenance position, the housing may be unclamped and lifted away from the receiver box disconnecting the ducting interface.

The pivotal mounting assembly may include at least one, preferably two, pivot hinges located on one side of the housing. The pivot hinge preferably connecting the housing to the top deck of the work machine. Advantageously, the pivot hinge is a releasable hinge.

The pivotal mounting assembly may also include at least one lifting linkage on one of more of the sides of the housing perpendicular to the side of the housing the pivot hinge connection is located on. The lifting linkage may be a gas strut. The lifting linkage is configured to assist in raising the housing about the pivot hinges, so that the service technician needs to apply a comfortable load, and so that the articulation angle is limited. The lifting linkage can be releasably connected to the housing.

On the side of the housing opposite the pivot hinge connection there may be latching elements to secure the housing in the operating position.

The housing may be mounted to at least partially sit within a recess formed in the top deck of the work machine.

Advantageously, the HVAC module is a unitary assembly that is removable from the work machine and replaceable.

The HVAC module may include at least an operational component region, a condenser region and a conditioning region. The operational component region preferably includes at least a motor and a compressor, the motor operable to drive the compressor. The motor is preferably a hydraulic motor that draws hydraulic fluid from a hydraulic supply external to the HVAC module, advantageously regulated by a manifold.

The condenser region preferably includes a condenser and at least one fan, the fan(s) being operable to draw air from the ambient environment external of the housing.

The conditioning region preferably includes the at least one air inlet and at least one air outlet, evaporator and heater cores and a blower.

The evaporator core is preferably in fluid communication with the compressor and condenser to convey refrigerant. A refrigerant flow path is preferably created from the compressor to the condenser to the evaporator core and back to the compressor. Advantageously between the compressor and the condenser there is provided a high pressure charge port. There may also be a pressure sensor. There may be associated with the evaporator a thermal expansion valve. Between the condenser and the thermal expansion valve there is preferably a receiver drier. Running back to the compressor from the evaporator, the refrigerant preferably passes via a pressure sensor and a low pressure charge port.

The conditioning region may also include an additional inlet for drawing in ambient air from the surrounding environment. A conditioned air flow path is typically created by drawing ambient air through the additional inlet from the external environment into the conditioning region of the housing. The ambient air passes via at least one filter to the evaporator. A pressurizer and/or a temperature sensor may also be located in the path before the ambient air passes through the evaporator. From the evaporator the air may pass via a temperature sensor or freeze-point probe and may then pass via a heater core to a blower. The blower forces the conditioned air through the air outlet to the ducting into the operator cab. Air is also drawn from the operator cab through the air inlet and recycled back through the conditioned air flow path by passing via a filter to the evaporator mixing with the ambient air to continue on the conditioned air flow path.

Hot coolant for the heater core is preferably drawn from the engine cooling system of the work machine.

An electronic control module (ECM) may be configured to control all aspects of the HVAC system, for example including the hydraulic components and the electrical functions, and to control the temperature of the airstream reaching the operator cab.

According to a second aspect of the invention, there is provided a heating, ventilation, and air conditioning (HVAC) system for a work machine, the HVAC system comprising:
  a HVAC module mountable to a work machine, the HVAC module comprising:
    a housing having at least one air outlet and at least one air inlet communicable with ducting on the work machine for conveying air into and out of the operator cab of the work machine, the outlet and inlet having openings that are downwardly orientated;
    a mounting assembly for pivotably attaching the housing to the work machine; and
  a receiver box mountable to the work machine adjacent the housing, the receiver box being connectable to ducting on the work machine and including at least one inlet opening and one outlet opening, both being upwardly orientated;
  wherein the module is moveable between an operating position where the downwardly orientated outlet and inlet on the housing are in contact with the upwardly orientated inlet and outlet on the work machine, respectively, and a maintenance position, where the housing is pivoted upwards to disconnect the ducting interface to allow access to underlying components of the work machine.

As used herein, the term "comprises" (and grammatical variants thereof) is used inclusively and does not exclude the existence of additional features, elements or steps.

BRIEF DESCRIPTION OF THE DRAWINGS

The present invention will now be described, by way of example only, with reference to the accompanying drawings, in which.

DETAILED DESCRIPTION

Figure 1:
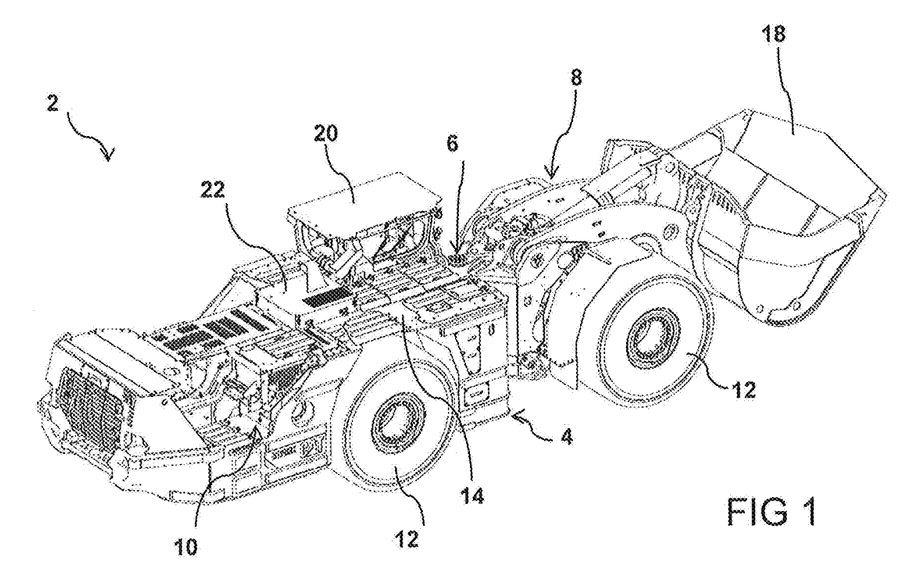
FIG. 1 is perspective view of an example work machine, a load-haul-dump machine in this case, with a HVAC module according to an embodiment of the present invention installed on its top deck.

Referring to FIG. 1, a work machine in the form of a load-haul-dump machine 2 is shown. A load-haul-dump machine is used in underground mines and runs back and forth to scoop rubble and transport and dump it onto a conveyer. Due to the restricted height and width of underground mine tunnels, load-haul-dump machines have a narrow, long, low profile. The body 4 is centrally articulated about a flexible joint 6 dividing the body into a first body portion 8 and a second body portion 10. Each body portion includes two opposing wheels 12.

The first body portion 8 has a bucket 18 for scooping and hauling rubble from within the tunnel. The second body portion 10 includes an engine, and hydraulic and electrical systems (not shown). The second body portion 10 has an operator cab 20 that projects above a top deck 14. The operator cab 20 is enclosed, with the operator seated sideways to provide adequate visibility when the machine is moving in either direction. The operator cab includes an operator control station (not shown) of the type that controls a heating, ventilation and cooling (HVAC) system.

Located generally on the top deck 14 is a HVAC module 22. Providing fluid communication between the operator cab 20 and the HVAC module 22 is outlet ducting 36 to convey air out of the HVAC module 22 into the operator cab. Inlet ducting 34 conveys recirculated air out of the operator cab 20 back to the HVAC module 22. This keeps the environment comfortable for the operator. Details of the ducting will be described further below.

Figure 2:
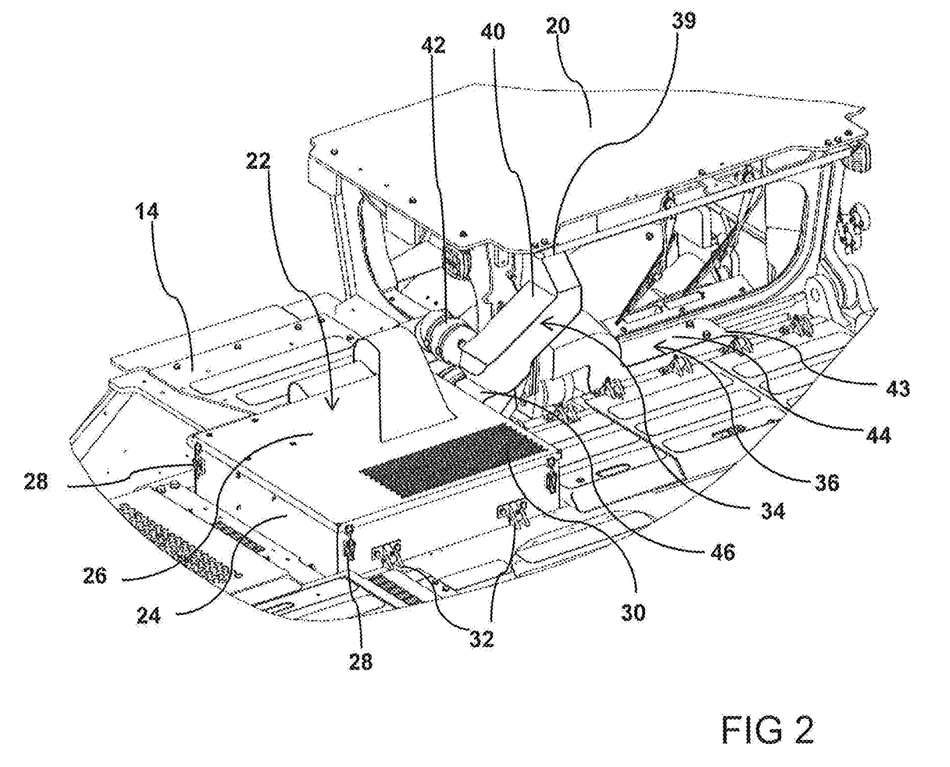
FIG. 2 is a close up view of the HVAC module shown of FIG. 1.

FIG. 2 shows a close-up view of the HVAC module 22 shown in FIG. 1. The HVAC module 22 includes a housing comprised of a lower box 24 and an upper lid 26. The lower box 24 and upper lid 26 would typically be made from sheet steel. The lid has an array of vents 30 located towards a corner of the lid (to be discussed further below). The upper lid 26 is illustrated as being clamped to the lower box 24 with lid clamps 28. The lid clamps 28 can be released so that the lid can be lifted upwards off the lower box 24. However, it will be appreciated that hinges may also be provided in addition to clamps, such that the lid may be pivotally joined to one side of the lower box. The lid 26 could then be pivoted open and closed, and clamped in the closed position. A gas strut could be provided within the lower box to assist with lifting of the lid.

According to the embodiment illustrated, the lower box 24 has a longer side of approx. 874 mm, a shorter side of approx. 790 mm and a height of approx. 350 mm, therefore having a generally rectangular shape. The HVAC module is recessed into the top deck 14 to reduce the impact on the operator's visibility in that direction compared to if it were positioned directly on top of the deck 14. The lower box 24 is illustrated as being recessed into the top deck 14 by approx. 154 mm. The recess is indicated by reference numeral 16 in FIG. 3. This results in approx. 196 mm of the lower box 24 projecting above the top deck 14.

Figure 3:
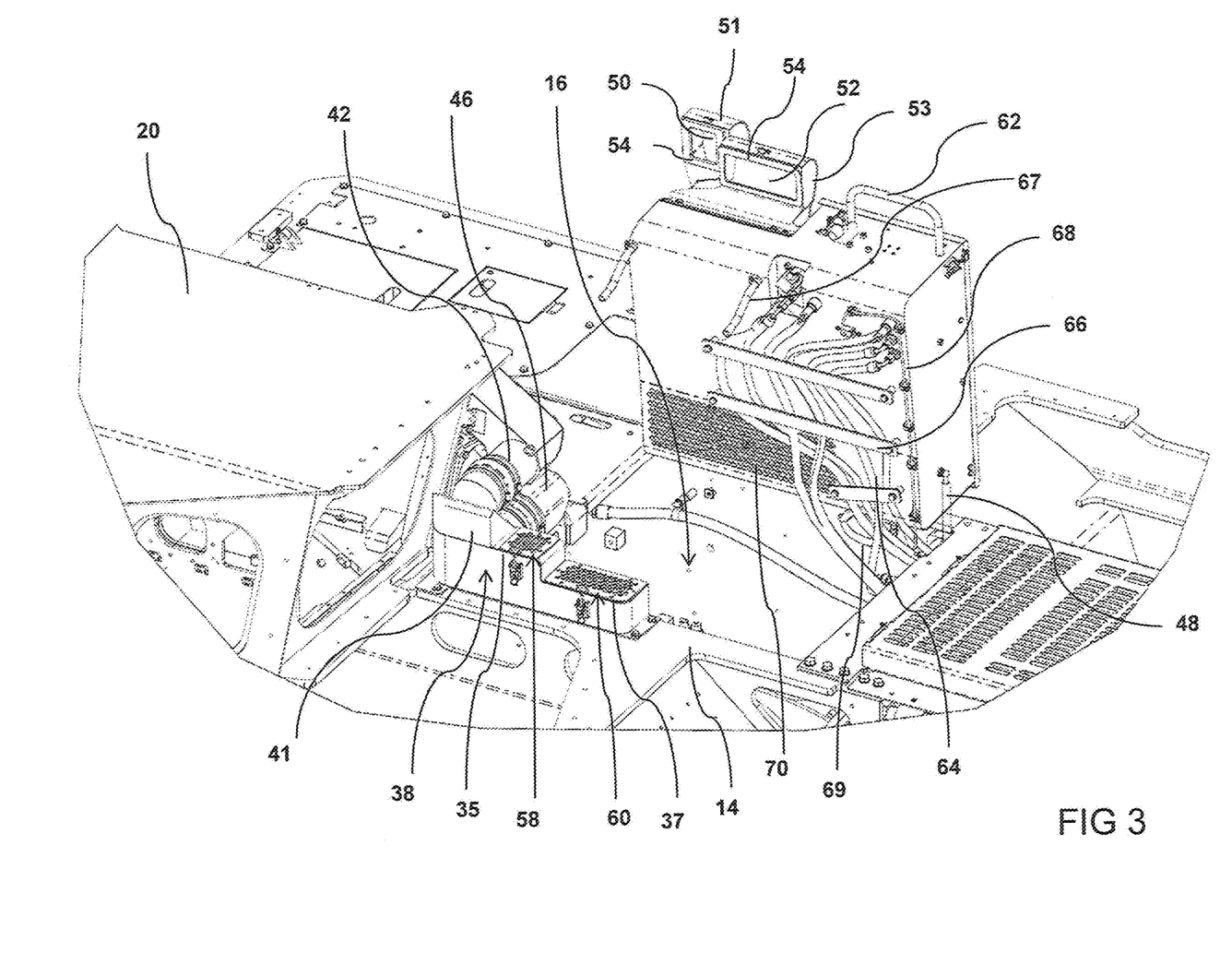
FIG. 3 is a perspective view of the HVAC module in a maintenance position.

The HVAC module 22 is preferably located directly above the torque converter package (not shown). As the torque converter package is typically serviced daily, the HVAC module 22 is pivotally mounted to the top deck via pivot hinges 32. To allow seating in the recess 16, the pivot hinges 32 are located part way down the side wall of the lower box. The HVAC module 22 is pivotable between an operating position, as shown in FIG. 2, and a maintenance position, as shown in FIG. 3. In the maintenance position, access can be gained to the recess 16 and therefore the torque converter package and other components located underneath for maintenance purposes.

Enabling the movement between the operating position and the maintenance position is a lifting linkage in the form of a gas strut 48. The gas strut is connected to one side of the lower box 24 and extends down below the top deck to connect to the chassis. It will be appreciated that whilst only one gas strut is illustrated, another gas strut may be provided on the other side of the lower box. A handle 62 is provided on the lower box to assist in movement of the HVAC module by an operator.

As can be seen in FIG. 3, there are a number of hydraulic hoses 64 connected to the underside of the HVAC module 22. These hydraulic hoses 64 connect at their other end to the working machine. The hydraulic hoses 64 are provided with sufficient length to be able to be lifted into the maintenance position. The hoses 64 are held in place against the underside of the HVAC module 22 by platework 66. This allows the hoses 64 to bend as the HVAC module is lowered. Additional hoses 67 are positioned at the bottom of the module to allow condensate from within the module to drip into and then purge from the box 24. These additional hoses 67 may contain a one-way valve. An array of vents 70 can also be seen in FIG. 3, positioned towards a corner of the base (to be discussed further below).

Also located on the bottom surface of the lower box 24 are electrical cables 68. The electrical cables 68 run along the underside of the box 24 and are provided with sufficient length to create a loop 69 to allow flexure when the module is elevated to the maintenance position.

Figure 4:
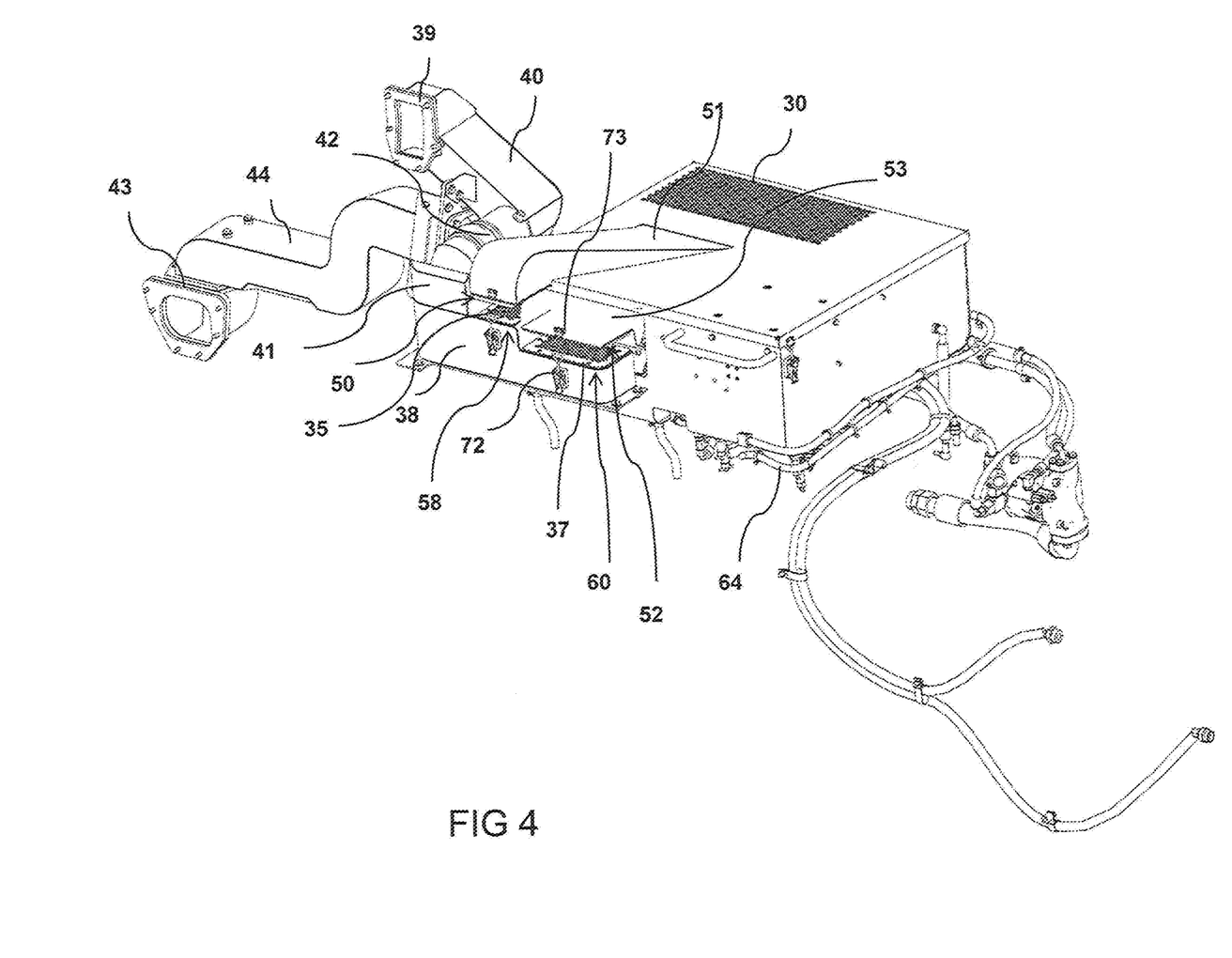
FIG. 4 is a perspective view of the HVAC module and associated ducting and cables in a partially open position.

An air inlet opening 50 and an air outlet opening 52 are generally adjacent one another on the HVAC module 22. Referring to FIG. 4, it can be seen that inlet opening 50 is created by a hood 51 that projects above the planar top surface of the lid 26. The hood 51 creates a channel from the opening 50 to an inlet into the housing. The outlet opening 52 is also created by a hood 53 that projects from the side of the lower box. The hood 53 creates a channel that leads into an outlet in the side wall of the lower box 24. The hoods 51, 53 are formed to orientate the openings 50, 52 downwards, when in the operating position.

Running between the operator cab 20 and the HVAC module is the inlet ducting 34 and the outlet ducting 36. The inlet ducting 34 includes an inlet fixed duct section 40. One end 39 of the inlet fixed duct section 40 connects to an upper region of the wall of the operator cab 20. The other end of the inlet fixed duct section 40 connects to an inlet flexible duct section 42. The connection makes an elbow in the flow path (see FIG. 3). The inlet flexible duct section 42 then connects to a receiver box 38 mounted on the top deck 14 adjacent the recess 16.

Similarly, the outlet ducting 36 includes an outlet fixed duct section 44. One end 43 of the outlet fixed duct section 44 connects to a lower region of the wall of the operator cab 20. The other end of the outlet fixed duct section 44 connects to an outlet flexible duct section 46. Similarly, this connection can make an elbow in the flow path. The outlet flexible duct section 46 then connects to the receiver box 38.

The receiver box 38 has a generally rectangular footprint and includes two internal flow paths. The two flow paths are formed by generally horizontal chambers that sit one above the other (to be described further below). The upper surface of the receiver box 38 is stepped creating two upper surface regions 35, 37. The upper surface regions 35, 37 include receiver box inlet opening 58 and outlet opening 60, respectively. These openings 58, 60 are upwardly orientated. Extending from the uppermost surface region 35 is a triangular shaped box, or elbow 41. The elbow 41 allows the connection of the generally horizontal top surface region 35 to the generally horizontally orientated inlet flexible duct section 42.

Figure 5:
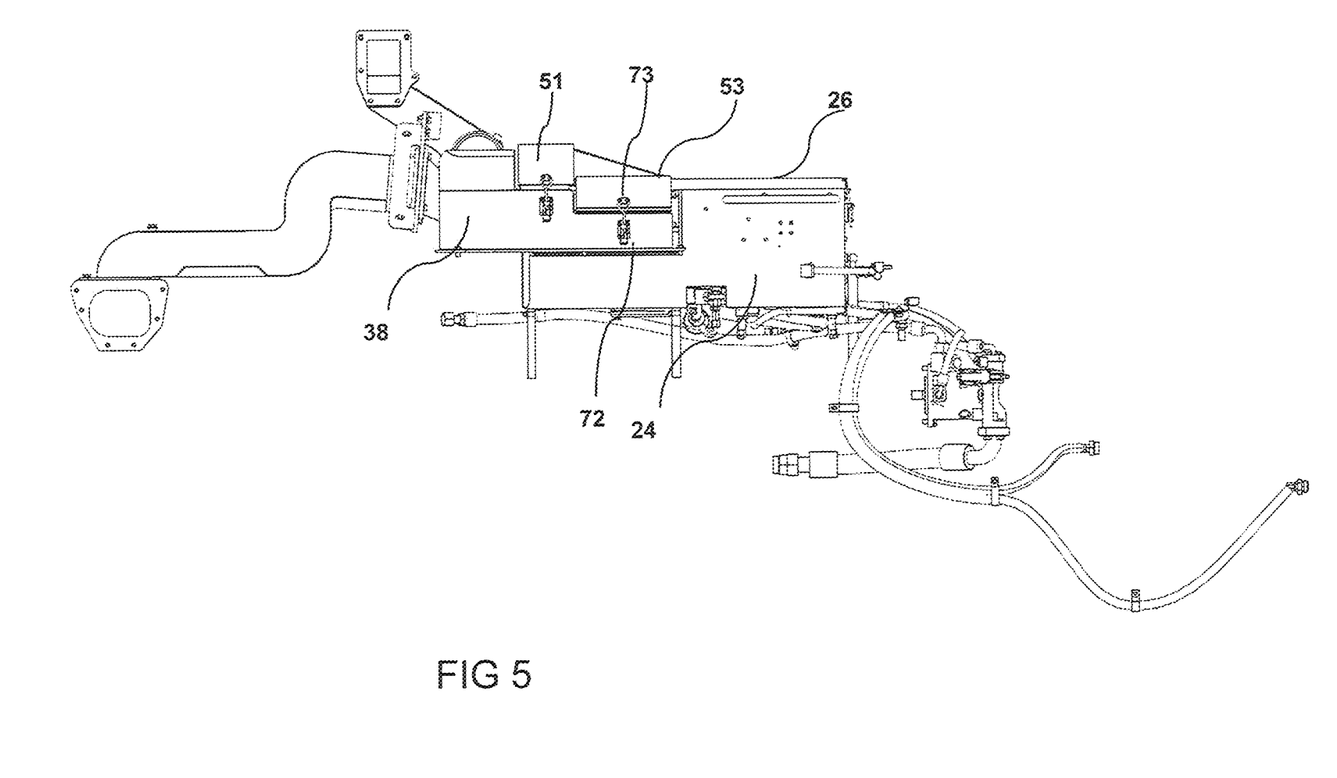
FIG. 5 is a left view of the HVAC module and associated ducting and cables of FIG. 4 in a closed position.

The receiver box is positioned so that upon lowering of the HVAC module into the operating position, the inlet opening 50 and the outlet opening 52 align with the receiver box inlet 58 and outlet 60, respectively. This can be seen in FIG. 4 where the HVAC module 22 is being lowered into position relative to the receiver box 38. As the HVAC module 22 is lowered into the operating position, as shown in FIG. 5, the downwardly facing inlet opening 50 and outlet opening 52 abut against the upwardly orientated inlet 58 and outlet 60, respectively. The receiver box 38 includes two latch clamps 72 that align with latches 73 on the inlet and outlet hoods 51, 53. Once fully lowered, latch clamps 72 are fastened to latches 73 locking the HVAC module 22 to the receiver box 38.

The receiver box inlet 58 and outlet 60 are created by a plurality of hexagonal apertures arranged to form honeycomb plates. The honeycomb plates may be integrally formed with the upper surfaces 35, 37 or may be separate overlying plates. Such a honeycomb aperture structure maximises airflow whilst maintaining structural integrity to the top of the receiver box 38 and also provides sealing surface area. Located about the inlet opening 50 and the outlet opening 52 are seals 54. The seals 54 typically comprise a pad of 5-10 mm thick low porosity neoprene foam. However it will be appreciated that any suitable seal may be utilised. As the HVAC module is fastened to the receiver box 38, the seals 54 are clamped against the top surface of the receiver box 38 about the edge of the honeycomb plates. It will be appreciated that the seals could alternatively be connected to the receiver box.

Figure 6:
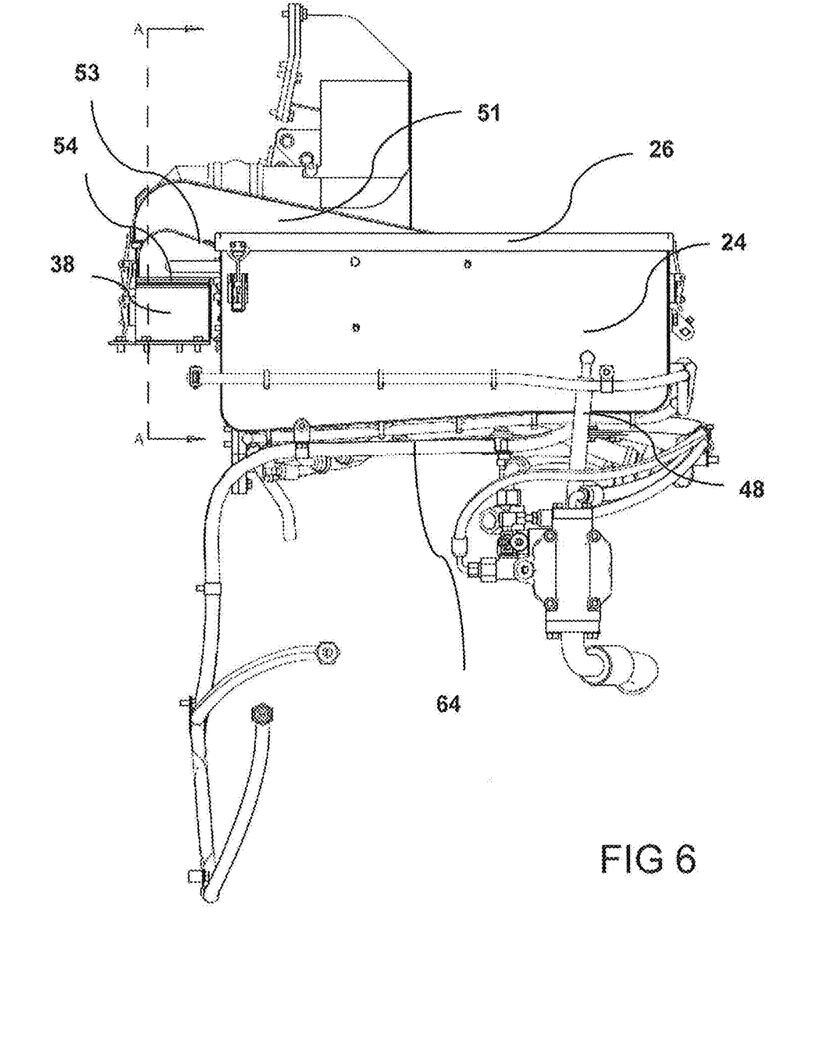
FIG. 6 is a rear view of the HVAC module and associated ducting and cables of FIG. 5.
Figures 7, 7A:
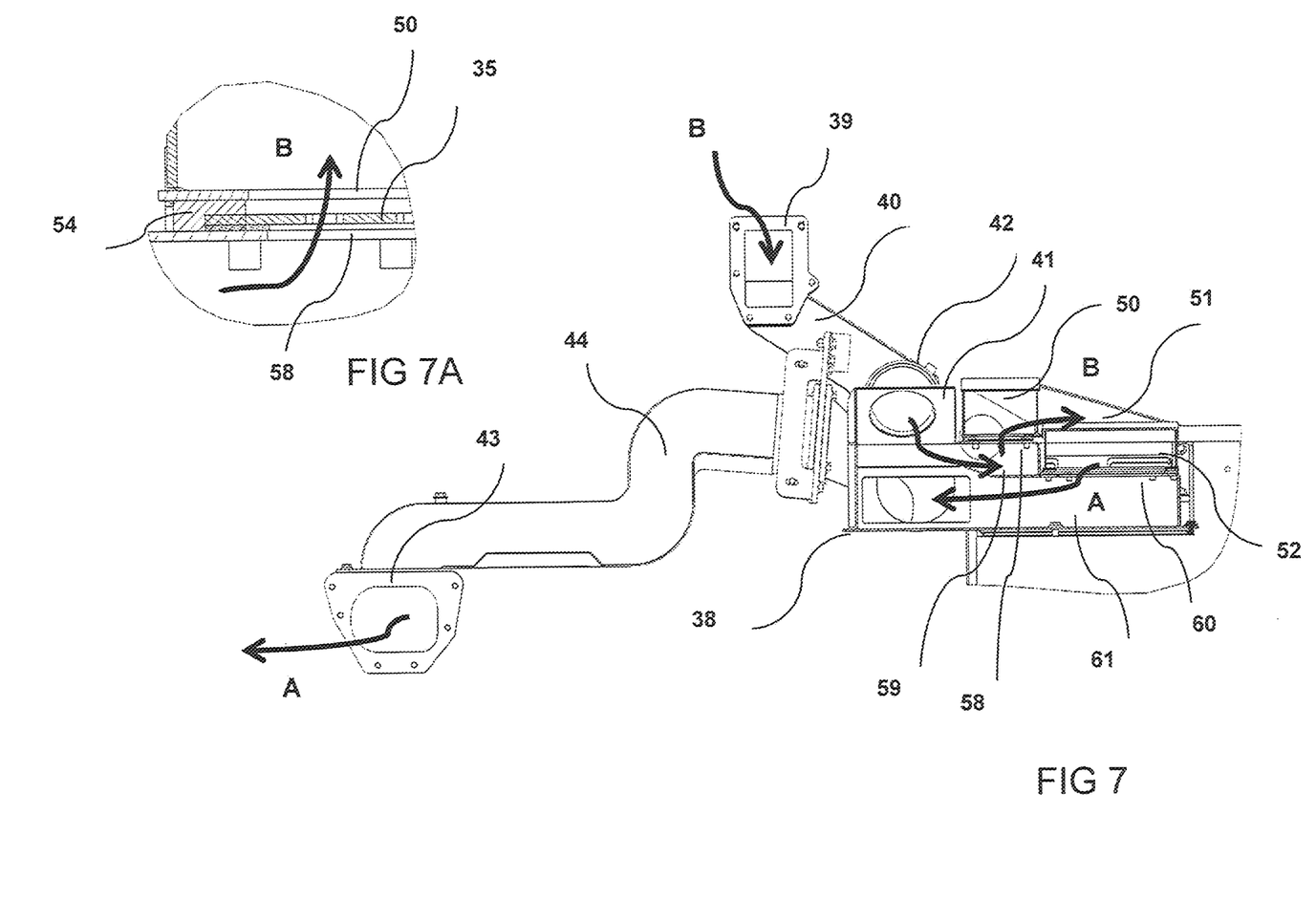
FIG. 7 is a cross-sectional left view through lines A-A in FIG. 6.
FIG. 7A is a close up view of the area circled B in FIG. 7.

A rear view of the clamped operating position is shown in FIG. 6. A sectional front view is taken through lines A-A and shown in FIG. 7. FIG. 7 illustrates the two flow paths through the receiver box 38. Conditioned air from the HVAC modules travels along air flow path A into the operator cab 20. The conditioned air flows out of the outlet opening 52 through the receiver box outlet 60 into the lower receiver box chamber 61. From the receiver box chamber 61 the air flows to the outlet flexible duct section 46, through the outlet fixed duct section 44 to the end 43, and into the operator cab 20. Return air from the operator cab 20 travels along the return air flow path B from the end 39 of the inlet fixed duct section 40. The air travels along the inlet fixed duct section 40 to the receiver box 38 via the inlet flexible duct section 42, turning at elbow 41. The air enters the upper receiver box chamber 59 flowing to the receiver box inlet 58 through inlet opening 50 along hood 51 into the HVAC module 22. As shown in FIG. 7A, a sealed connection is created between the HVAC module 22 and the receiver box 38 by downward clamping of the HVAC module 22 to the upper surface of the receiver box 38. The seal 54 prevents the escape of air between the components.

Figure 8:
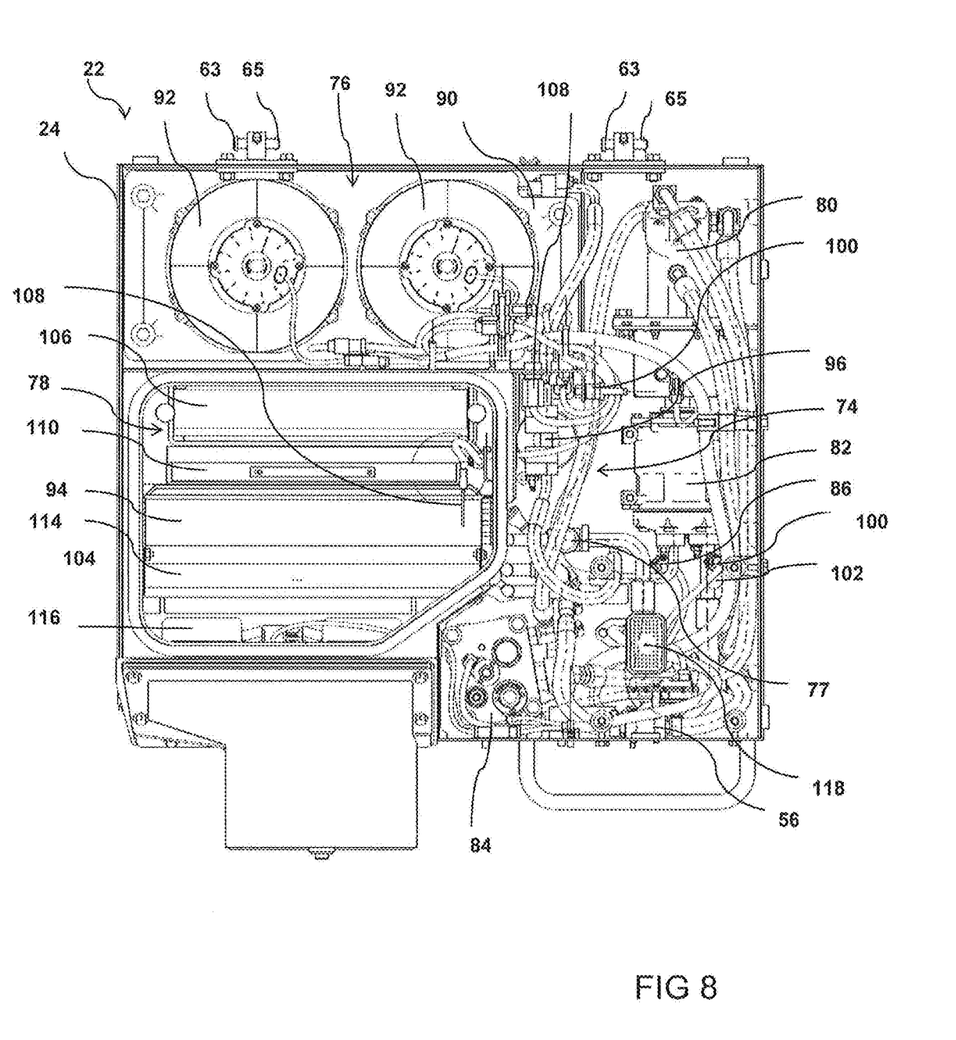
FIG. 8 is a top view of the HVAC module with the lid removed.

To minimise the downtime of work machines if the HVAC module requires repair, the HVAC module is fully removable from the work machine. This is accomplished by employing releasable pivot hinges, where a pin 63, held in by a circlip 65, can be removed to allow disconnection, as best seen in FIG. 8. The gas strut 48 is connected to the housing with a ball joint, such that it can be quickly disconnected. The hydraulic hoses 64, and electrical cables 68, can be disconnected. The HVAC module can then be lifted out of the recess 16 and replaced by another HVAC module.

INDUSTRIAL APPLICATION

Figure 9:
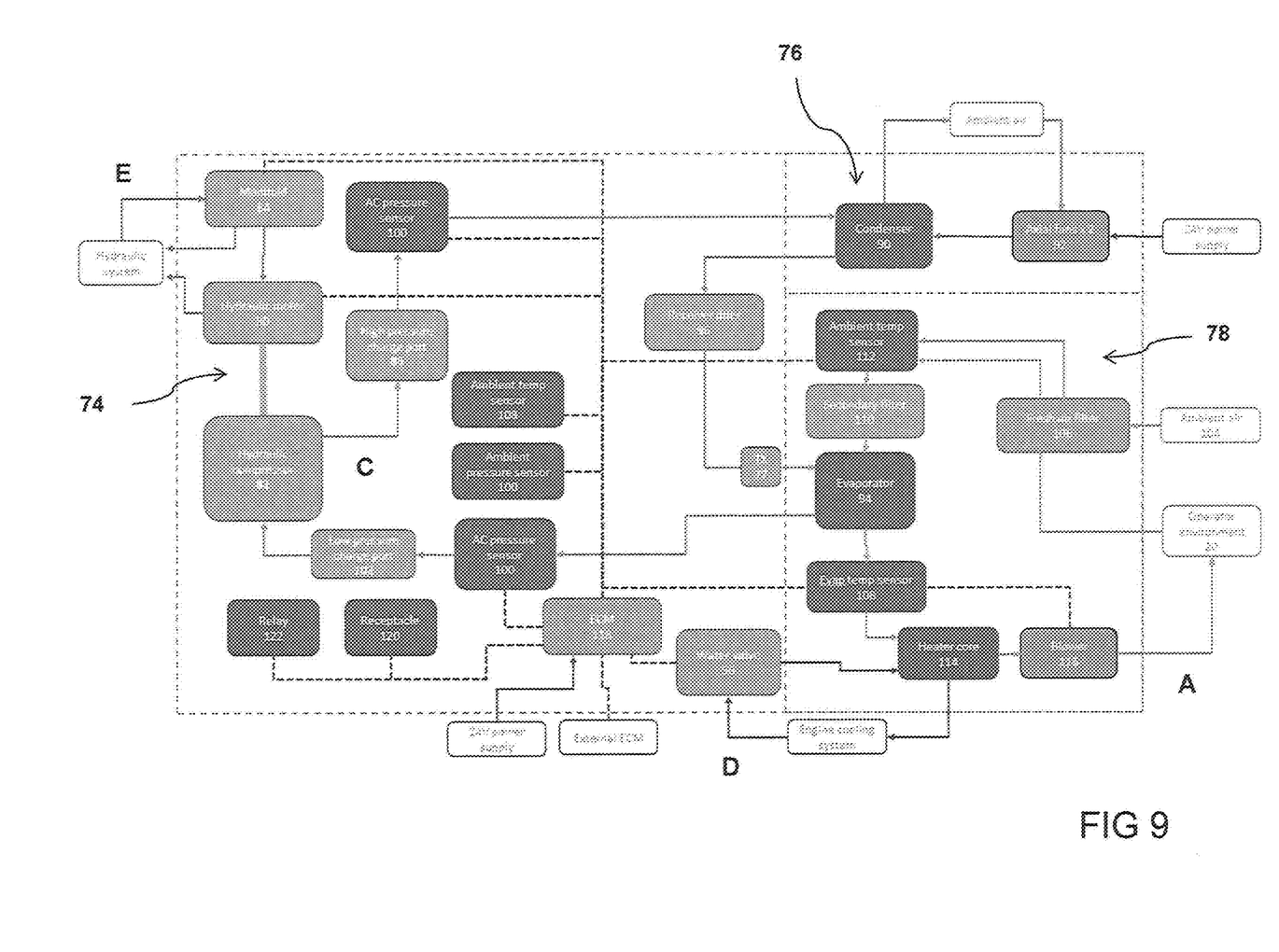
FIG. 9 is a boundary diagram of the HVAC module according to one embodiment.

Referring to FIGS. 8 and 9, the internal components of the HVAC module 22 and operation of the HVAC system will be explained. FIG. 8 shows a top view of the lower box 24 with upper lid removed. The lower box 24 is partitioned into three regions using sheet steel walls. The three regions are the operational component region 74, the condenser region 76 and the conditioning region 78. This is diagrammatically illustrated in the boundary diagram of FIG. 9.

The operation region 74 includes a hydraulic motor 80 and a hydraulic compressor 82. The motor 80 drives the compressor 82. The motor 80 draws hydraulic fluid from a hydraulic supply external to the HVAC module (typically associated with the work machine torque converter pump stack) and is regulated via a manifold 84. The hydraulic fluid flow path E is illustrated in FIG. 9.

Also housed in the operational region 74 are a high pressure charge port 86 and a low pressure charge port 102, together with a receiver drier 96. A thermal expansion valve 77 (commonly referred to as a TX valve) is also housed in this region. A number of pressure sensors 100 and temperature sensors 108 are also located in the operational region 74. An electronic control module (ECM) 118 and a water valve 56 complete the preferred components housed in the operational region 74. However, it will be appreciated that other components associated with the HVAC system may also be housed in the operational region.

The condenser region 76 contains a condenser 90 and two axial fans 92. The axial fans 92 draw fresh air from the ambient environment through the vents 30 in the upper lid 26. This air blows over the condenser 90. The air is then ejected out of the lower vents 70 into the underlying transmission bay.

Figure 4A:
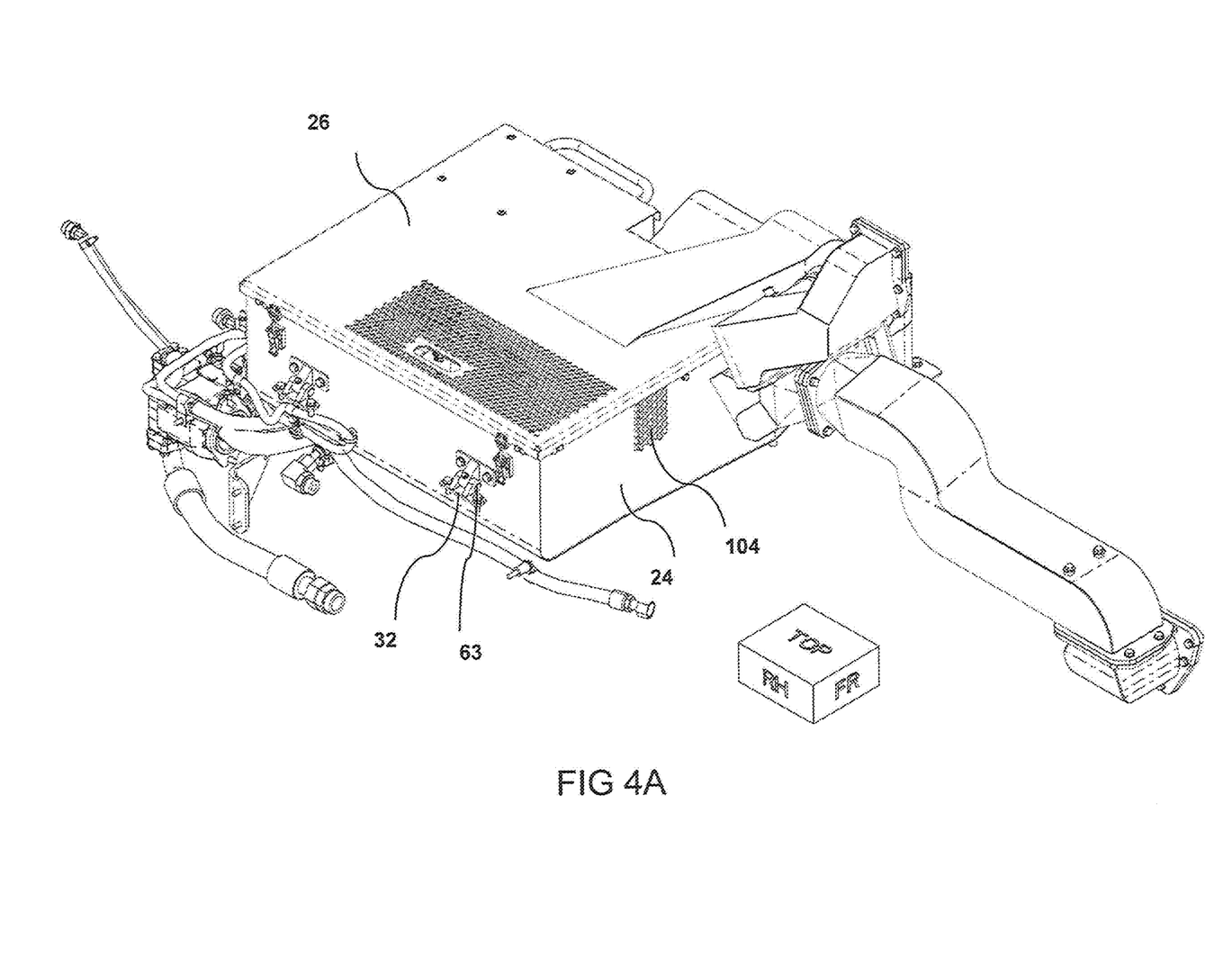
FIG. 4A is a perspective front view of the HVAC module.

The conditioning region 78 includes an evaporator 94, a heater core 114 and a blower 116. Fresh air filter 106 and secondary filter 110 are also housed within the conditioning region, together with temperature sensors 108. A fresh air inlet 104 is located in the sidewall of the lower box 24 (see FIG. 4A). The evaporator typically communicates with the TX valve 77, which regulates the flow rate through the evaporator, controlling the superheating of the refrigerant within the evaporator.

The components are generally adapted to work in concert to produce HVAC cooling and/or heating, as will be appreciated by those skilled in the art. The ECM is configured to control all aspects of the HVAC system, including the hydraulic components and electrical control functions, as illustrated in the boundary diagram in FIG. 9 by the dashed connection lines.

FIG. 9 schematically illustrates the refrigerant flow path C. Refrigerant in a gaseous state moves from the compressor 82 to the condenser 90 via high pressure charge port 86 and AC pressure sensor 100. The refrigerant enters the condenser 90 where it is cooled from its superheated state and condenses into a cooled liquid phase. The liquid refrigerant passes through the receiver drier 96, which dries the refrigerant, increasing the heat rejection capacity of the fluid. The refrigerant then passes through the TX valve 77, which meters the amount of refrigerant flowing through the evaporator 94, allowing a low entropy liquid and vapor mixed refrigerant to enter the evaporator. The refrigerant evaporates and returns to a gaseous state, gaining energy from the air flow, where it is returned to the compressor 82 via an AC pressure sensor and low pressure charge port 102. The refrigerant continues to cycle through the flow path C.

Hot coolant is drawn from the engine cooling system of the work machine 2 and supplied to the heater core 114. The engine coolant flow path D is illustrated in FIG. 9 whereby the hot coolant passes via a water valve to the heater core. The water valve is ECM position controlled, whereby the position of the internal ball valve controls the flow rate and hence heat exchange to the airstream. A receptacle 120 and relay 122 are required for the water valve 56, to take the low-power signal outputs from the ECM 118 and boost the signal to the required voltage for the water valve solenoid to actuate.

Within the conditioning region 78 air is circulated. Fresh ambient air is drawn in through air inlet 104 in the front of the housing and passes through a fresh air filter 106. Concurrently, return air is circulated back into the conditioning region 78 via inlet opening 50. The mixed fresh air and return air is then passed via temperature sensor 112 through a secondary filter 110. The filtered air is passed through the evaporator where it is cooled, if cooling is required in the operator cab 20. It then passes through the heater core 114, where it is heated, if heating is required in the operator cab 20. Air at the desired temperature air is then blown into the outlet ducting by a blower 116, which transfers the air to the operator cab 20.

The advantage of utilising substantially fixed ducting is that the cross-sectional profile of the ducting is more controllable, enabling minimalisation of pressure loss from surface friction in the airstream and allowing turbulence control. Turbulence commonly exists in flexible hoses, particularly those that are ribbed. By limiting the amount of flexible ducting to a small section, the required flexibility between fixed bodies is provided to allow for vehicle movement and vibration, whilst minimising turbulence. Use of the static receiver box to create the duct interface with the HVAC module inlet and outlet ensures a good seal is maintained, whilst allowing the easy disconnection to move the housing into the maintenance position. By utilising opposing downwardly and upwardly orientated openings at the duct interface, a positive clamping force can be applied to ensure an equilibrant pressure across the seal interface, for optimal sealing and pressurisation.

Although aspects of the present disclosure were described with reference to underground loaders, it should be appreciated that many of the features and advantages described herein may have broad applicability across a wide range of machines. For example, many of the features described herein may be applicable to different types of loaders and trucks, whether for above ground or underground use.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A heating, ventilation, and air conditioning (HVAC) module, for an HVAC system, mountable to a work machine, the HVAC module comprising:
   a housing defining a first air port and a second air port communicable with ducting on the work machine for conveying air into and out of an operator cab of the work machine;
   an HVAC evaporator disposed within the housing, the first air port being fluidly coupled with the second air port via the HVAC evaporator; and
   a pivotal mounting assembly for pivotably attaching the housing to the work machine,
   wherein the housing is moveable between an operating position where the the first air port is in contact with a ducting interface on the work machine, and a maintenance position, where the housing is pivoted upwards to disconnect from the ducting interface of the work machine to allow access to underlying components of the work machine,
   wherein the housing includes an upper lid disposed on a lower box, an external surface of the upper lid facing away from the lower box along an upward vertical direction,
   wherein an aperture of the first air port faces a downward vertical direction, the downward vertical direction being opposite the upward vertical direction,
   wherein the aperture of the first air port is arranged to mate with one opening of an inlet opening and an outlet opening, on the work machine, the one opening of the inlet opening and the outlet opening facing the upward vertical direction,
   wherein the upper lid includes a hood portion, and
   wherein the aperture of the first air port is at least partly defined by the hood portion of the upper lid.

2. The HVAC module according to claim 1, wherein the pivotal mounting assembly includes at least one pivot hinge located on a first side of the housing, and the aperture of the first air port is located on a second side of the housing, the first side of the housing being opposite the second side of the housing.

3. The HVAC module according to claim 2, wherein the pivotal mounting assembly includes at least one lifting linkage on one or more sides of the housing that are perpendicular to the first side of the housing where the pivotal mounting assembly is located.

4. The HVAC module according to claim 1, wherein the HVAC module is a unitary assembly that is removable from the work machine and replaceable.

5. The HVAC module according to claim 1, further comprising a motor operatively coupled to a compressor, and a condenser fluidly coupled to the compressor and the HVAC evaporator,
   the motor, the compressor, and the condenser all being disposed within the housing.

6. The HVAC module according to claim 1, wherein the upper lid is removable from the lower box.

7. The HVAC module according to claim 2, further comprising latching elements to secure the housing in the operating position, the latching elements being located on a side of the housing opposite the at least one pivot hinge.

8. A heating, ventilation, and air conditioning (HVAC) system for a work machine, the HVAC system comprising:
   an HVAC module mountable to a work machine, the HVAC module comprising:
      a housing including an upper lid disposed on a lower box, an external surface of the upper lid facing away from the lower box along an upward vertical direction,
      the housing defining a first air port and a second air port communicable with ducting on the work machine for conveying air into and out of an operator cab of the work machine, an aperture of the first air port facing a downward vertical direction, the downward vertical direction being opposite the upward vertical direction;

an HVAC evaporator disposed within the housing, the first air port being fluidly coupled with the second air port via the HVAC evaporator;

a mounting assembly for pivotably attaching the housing to the work machine; and a receiver box mountable to the work machine adjacent to the housing, the receiver box being connectable to ducting on the work machine and including an inlet opening and an outlet opening, one opening of the inlet opening and the outlet opening facing the upward vertical direction, wherein the housing is moveable between an operating position that effects a ducting interface where the aperture of the first air port is in contact with the one opening of the inlet opening and the outlet opening on the receiver box facing the upward vertical direction, and a maintenance position, where the housing is pivoted upwards to disconnect the ducting interface to allow access to underlying components of the work machine, wherein the upper lid includes a hood portion, and wherein the aperture of the first air port is at least partly defined by the hood portion of the upper lid.

9. The HVAC system according to claim 8, further comprising ducting mountable to the work machine, the ducting including an inlet duct and an outlet duct, both the inlet duct and the outlet duct comprising a fixed duct section configured to connect to the operator cab and a flexible duct section configured to connect to the receiver box.

10. The HVAC system according to claim 8, wherein, in the operating position, the aperture of the first air port of the HVAC module abuts against the one opening of the inlet opening and the outlet opening of the receiver box facing the upward vertical direction, with their respective surfaces aligned, the ducting interface being sealed by a seal located about the one opening of the inlet opening and the outlet opening of the receiver box facing the upward vertical direction.

11. The HVAC system according to claim 8, wherein the housing is configured to be mounted to at least partially sit within a recess formed in a top deck of the work machine.

12. The HVAC system according to claim 8, wherein the receiver box has an inlet channel and outlet channel aligned one above the other, both running in a generally horizontal direction, the generally horizontal direction being transverse to the upward vertical direction.

13. The HVAC module according to claim 1, wherein the aperture of the first air port extends beyond an interface between the upper lid and the lower box along a transverse direction, the transverse direction being transverse to the upward vertical direction.

14. The HVAC system according to claim 8, wherein the aperture of the first air port extends beyond an interface of the upper lid and the lower box along a transverse direction, the transverse direction being transverse to the upward vertical direction.

15. A heating, ventilation, and air conditioning (HVAC) system for a work machine, the HVAC system comprising:

an HVAC module mountable to a work machine, the HVAC module comprising:

a housing including an upper lid disposed on a lower box, an external surface of the upper lid facing away from the lower box along an upward vertical direction, the housing defining a first air port and a second air port communicable with ducting on the work machine for conveying air into and out of an operator cab of the work machine, an aperture of the first air port facing a downward vertical direction, the downward vertical direction being opposite the upward vertical direction;

an HVAC evaporator disposed within the housing, the first air port being fluidly coupled with the second air port via the HVAC evaporator;

a mounting assembly for pivotably attaching the housing to the work machine; and a receiver box mountable to the work machine adjacent to the housing, the receiver box being connectable to ducting on the work machine and including an inlet opening and an outlet opening, one opening of the inlet opening and the outlet opening facing the upward vertical direction, wherein the housing is moveable between an operating position that effects a ducting interface where the aperture of the first air port on the housing is in contact with the one opening of the inlet opening and the outlet opening on the receiver box facing the upward vertical direction, and a maintenance position, where the housing is pivoted upward to disconnect the ducting interface to allow access to underlying components of the work machine, and wherein the aperture of the first air port extends beyond an interface of the upper lid and the lower box along a transverse direction, the transverse direction being transverse to the upward vertical direction.

16. The HVAC module according to claim 1, wherein the first air port is an air outlet of the housing disposed downstream of the HVAC evaporator along an air flow direction through the HVAC evaporator, and the one opening of the inlet opening and the outlet opening facing the upward vertical direction is the inlet opening.

17. The HVAC module according to claim 16, wherein the second air port is an air inlet of the housing disposed upstream of the HVAC evaporator along an air flow direction through the HVAC evaporator, and both the inlet opening and the outlet opening face the upward vertical direction.

18. The HVAC module according to claim 1, wherein the first air port is an air inlet of the housing disposed upstream of the HVAC evaporator along an air flow direction through the HVAC evaporator, and the one opening of the inlet opening and the outlet opening facing the upward vertical direction is the outlet opening.

19. The HVAC module according to claim 18, wherein the aperture of the first air port and the aperture of the second air port are located on a same side of the housing.

20. The HVAC system of claim 8, wherein the first air port is an air outlet of the housing disposed downstream of the HVAC evaporator along an air flow direction through the HVAC evaporator, and the one opening of the inlet opening and the outlet opening facing the upward vertical direction is the inlet opening.

* * * * *